United States Patent [19]

Kostur

[11] 3,732,047
[45] May 8, 1973

[54] THERMOFORMING APPARATUS
[75] Inventor: Robert E. Kostur, Oak Brook, Ill.
[73] Assignee: Comet Industries Inc., Bensenville, Ill.
[22] Filed: Aug. 12, 1971
[21] Appl. No.: 171,385

Related U.S. Application Data

[63] Continuation of Ser. No. 808,075, March 18, 1969, abandoned.

[52] U.S. Cl. .................. 425/144, 425/29, 425/162
[51] Int. Cl. .................................. B29c 3/06
[58] Field of Search ................. 425/29, 140, 144, 425/162, 388, 143

[56] References Cited

UNITED STATES PATENTS

| | | | |
|---|---|---|---|
| 1,959,336 | 5/1934 | Bast et al. | 425/29 |
| 2,128,417 | 8/1938 | Kerr | 425/29 |
| 3,193,881 | 7/1965 | Kostur | 425/292 |
| 3,339,227 | 9/1967 | Ehrenfreund | 425/144 |
| 3,348,265 | 10/1967 | King et al. | 425/214 |
| 3,280,428 | 10/1966 | Watts, Jr. | 425/388 |
| 3,480,999 | 12/1969 | Carlo | 425/140 X |

FOREIGN PATENTS OR APPLICATIONS 211,312  11/1957  Australia .................. 425/29

Primary Examiner—R. Spencer Annear
Attorney—Fidler, Patnaude & Lazo

[57] ABSTRACT

A plastic program card includes a plurality of projecting rows of plastic each having notches at selected locations. It is driven through a program unit having a different push-button switch aligned with each row of the card to be actuated by the notches therein to control different functions of the thermoforming machine. The temperature of the sheet of plastic, the positions of the moving parts of the thermoforming machine, and the position of the plastic being formed are sensed by other devices within the thermoforming machine and these devices control further operations of the machine and control the driving of the plastic program card through the program unit.

9 Claims, 6 Drawing Figures

PATENTED MAY 8 1973

Inventor
Robert E. Koster
by Fidler, Bradley & Patnaude
Att'ys

PATENTED MAY 8 1973 3,732,047

Inventor
Robert E. Koster
by Kesler, Brusky & Petruccelli
Atty's

THERMOFORMING APPARATUS

This application is a continuation of Ser. No. 808,075, filed Mar. 18, 1969, now abandoned.

This invention relates to the art of thermoforming and more particularly relates to apparatus for controlling a thermoforming process.

In one type of thermoforming process, sheets of plastic are clamped to a frame and heated. In some of these processes one portion of the sheet is heated to a higher temperature than another by positioning a templet between a source of radiant heat and the plastic sheet during a portion of the heating time. After being heated, the sheet of plastic is held firmly about a mold cavity and a pressure differential is applied to the sheet causing it to be stretched outward from the mold cavity towards a plunger. After the plastic sheet has billowed toward the plunger, the pressure differential is reversed to permit the plastic to move into the mold cavity and the plunger is depressed therein to assist in forming the plastic article. The plunger is then removed. The formed article is cooled and removed from the thermoforming apparatus.

In some prior art thermoforming apparatus, the time for some of the operations is adjustable. For example, the amount of time that the heaters apply heat to the sheet of plastic is set by a skilled operator according to the article being formed and the heaters remain on for this period of time during each cycle of the thermoforming apparatus that forms one of the articles.

The prior art thermoforming apparatus and methods of controlling a thermoforming apparatus have the disadvantage of requiring skilled operators. This increases the expense of the articles formed by this process and, at times, results in a poor product because the operators are not performing in accordance with the best practices of the art.

It is known to control some processes without skilled operators by means of recorded programs each containing a series of steps that are to be performed one after the other at predetermined times. The programs are recorded on a tape or on cards having magnetized portions or mechanical changes in structure.

This type of programing apparatus is not completely satisfactory for controlling thermoforming apparatuses. The time that is required to perform some of the operations in the thermoforming processes, such as for example the time required to heat the plastic sheet, varies with a number of different conditions such as the ambient temperature in the room. Because of these variations in the time necessary to perform an operation, programs which provide a fixed time between steps cause a step to be terminated too soon or to continue too long under some conditions resulting in an unsatisfactory product.

It is also known to use an electronic computer that is capable of making comparisons to control equipment performing some processes. These computers contain a program with reference conditions that define the time of the operations. Conditions such as temperature and the position of movable members in the equipment performing the process are measured and fed to the computer. The computer compares the measured conditions with the recorded conditions and the results of the comparison are used to control the operations of the equipment performing the process.

This type of equipment has a disadvantage in that it is expensive. The computers themselves are expensive and they require skilled personnel to program and operate them. The requirement of skilled personnel further increases the expense and, as in the case of equipment that is manually controlled, sometimes results in a poor product because the operators of the equipment are not performing in accordance with the best practices.

Accordingly, it is an object of this invention to provide an improved apparatus for controlling thermoforming processes.

It is a further object of this invention to provide improved thermoforming apparatus.

It is a still further object of this invention to provide a simple and inexpensive apparatus for automatically controlling thermoforming equipment.

It is a still further object of this invention to provide apparatus for controlling thermoforming equipment, which apparatus permits the measurement of conditions within the thermoforming apparatus and in which the measurements of these conditions control the time of operation of the steps of a program.

It is a still further object of this invention to provide an improved programing apparatus for controlling thermoforming equipment, which programing apparatus includes a recording medium having a plurality of steps recorded upon it, each step being capable of controlling an operation by the thermoforming equipment and conditions within the thermoforming equipment being capable of causing the programming device to move to the next step.

In accordance with the above and further objects of the invention, an apparatus for controlling thermoforming equipment is provided. In this apparatus a plastic card that includes a plurality of projecting rows of plastic having notches in them at selected locations is moved by means of a stepping motor in a direction aligned with the rows. A different push-button switch is aligned with each of the rows to be actuated at selected times by the notches therein.

Each of the push-button switches controls a different operation of the thermoforming apparatus. For example, one push-button switch, when activated, causes the heating elements to move to a position above and below the sheet of plastic. Another push-button switch causes the heating elements to be energized to heat the sheet of plastic. Other functions of the thermoforming apparatus are similarly controlled by other push-button switches.

Within the thermoforming apparatus, are a plurality of sensing devices. For example, a temperature sensing device monitors the temperature of the sheet of plastic and limit switches monitor the positions of the mold parts. Signals from the sensing devices are used to control other operations and are also used to step the card from position to position. For example, the temperature sensing device causes the heating elements to be turned off and at the same time energizes the motor that drives the programing card so that it moves until another push-button switch is activated.

The programing card is either stopped when a push-button switch is activated or continues to move to sequentially activate different push-button switches one after the other with the time interval controlled by the speed that the program card is driven. If the program card is stopped when the push-button switch is activated, then it is started by one of the sensing devices of the thermoforming apparatus.

The same thermoforming apparatus is used to form a plurality of different articles and different programs are required for some of these articles.

Besides using a different program card to control the the thermoforming of each article, other replaceable auxiliary apparatuses are sometimes needed. For example, a templet is placed on top of a heat screen between the heating elements and the sheet of plastic to cause the sheet of plastic to be heated to a different temperature across different areas. This templet is used only with certain programs for certain articles and a different templet is used with other programs for other articles. A templet of this kind is conveniently stored with the program card with which it is to be used until needed and then the program card is inserted in the programing device and the templet is inserted within the thermoforming apparatus to cooperate together in forming the thermoformed article.

This apparatus for controlling a thermoforming process is simple in operation and inexpensive. It does not require a skilled operator since the programs are prepared by the manufacturer of the thermoforming apparatus ahead of time and stored for use whenever desired. With this apparatus the operation of the thermoforming equipment is completely automatic and is performed entirely with unskilled labor.

This programing technique does not require the use of an electronic computer capable of making comparisons since the conditions within the thermoforming apparatus are not compared with conditions stored within a computer. The conditions are only sensed to determine predetermined limits and, when these limits are sensed, the motor of the programing device is controlled accordingly. This enables the mechanism to be simpler than general computers used for controlling processes.

The invention in the above noted and other features thereof will be better understood from the following detailed description when considered with reference to the accompanying drawings in which.

THERMOFORMING APPARATUS

Figure 1:
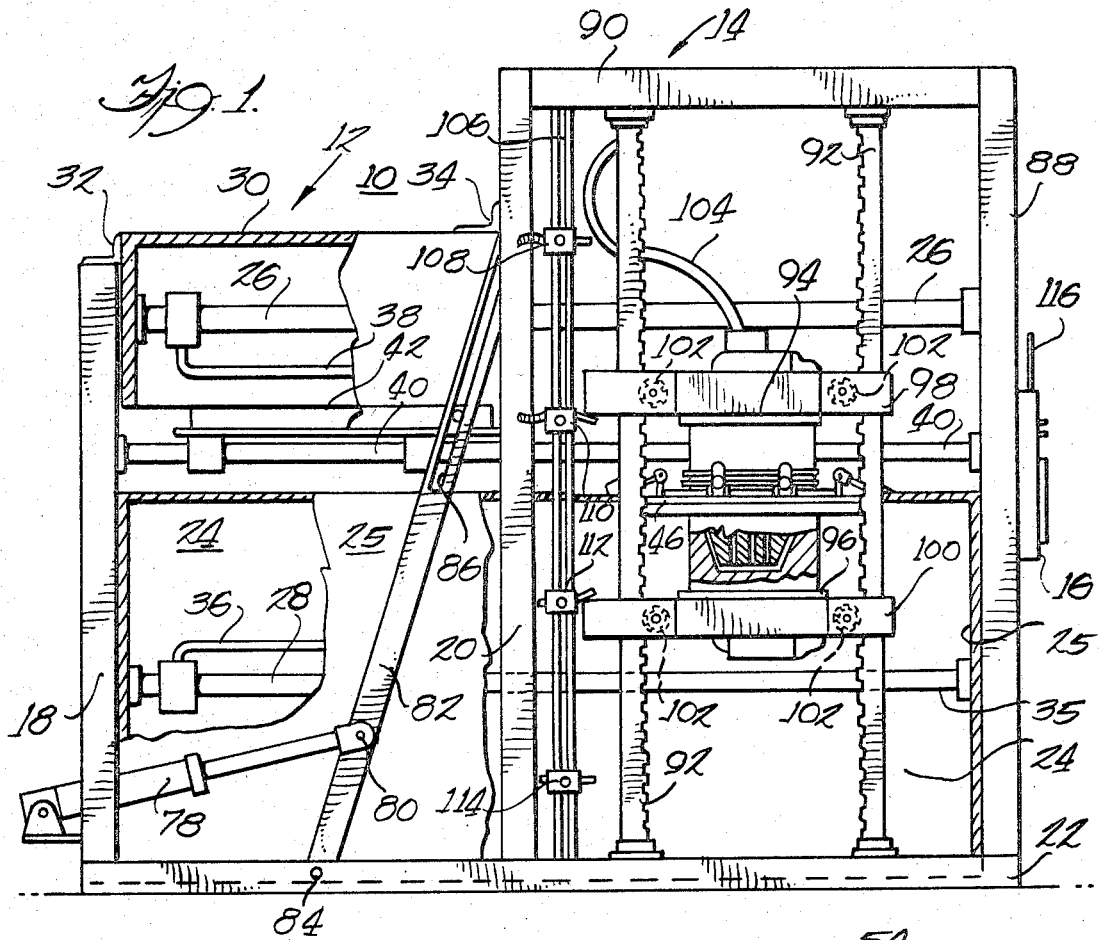
FIG. 1 is a side view, partially broken away and in section, illustrating an embodiment of the invention.

In FIG. 1 thermoforming apparatus 10 is shown in a side view, partially broken away and in section, having a retract station 12, a molding station 14, and a programing unit 16. The thermoforming apparatus 10 is illustrative only of the invention and other thermoforming apparatuses may incorporate the invention beside the one illustrated in FIG. 1.

The retract station 12 includes a frame in the form of a right parallelepiped having four vertical stanchions two of which, 18 and 20, are shown in FIG. 1 and four base members one of which is shown at 22 in FIG. 1. A hood 30 is mounted to the vertical stanchions above the retract station 12 by brackets two of which, 32 and 34, are shown in FIG. 1.

Extending across the lower portions of both the retract station 12 and the molding station 14 is a vacuum tank 24 having walls 25. Above the vacuum tank 24 two pairs of parallel tracks, the top heating elements carriage tracks 26 and the heat screen carriage tracks 40, extend across both the retract station 12 and the molding station 14. Within the vacuum tank 24, another pair of parallel tracks, the bottom heating elements carriage tracks 28, extends across both the retract station 12 and the molding station 14.

To heat a sheet of plastic, a plurality of bottom heating elements 36 are mounted to a movable carriage journaled to the parallel tracks 28 within the vacuum tank 24 and a plurality of top heating elements 38 are mounted to another movable carriage journaled to the parallel tracks 26 within the hood 30. The pair of parallel tracks 40 supports a heat screen carriage 42.

Figure 2:
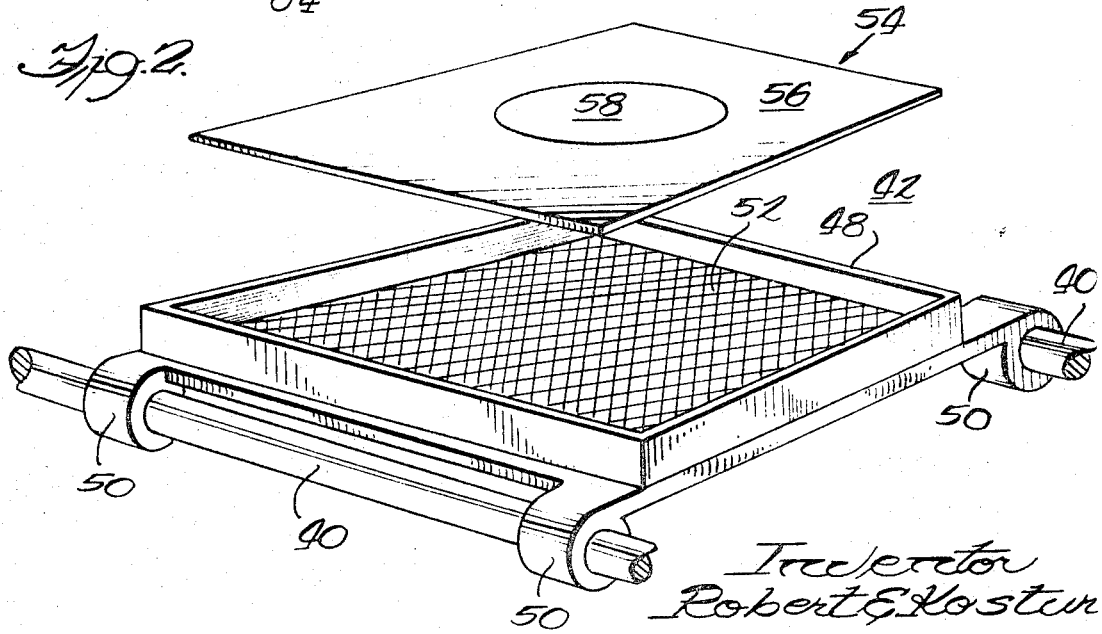
FIG. 2 is an enlarged, fragmentary, exploded view, in perspective, of a heat screen carriage and templet as used in the embodiment of the invention shown in FIG. 1.

As best shown in FIG. 2, the heat screen carriage 42 includes a rectangular frame 48 mounted to the parallel tracks 40 by means of the four corner journals 50 to be moved between the interior of the retract station 12 and the interior of the molding station 14 by means of a lever 82 (FIG. 1). The bottom of the rectangular frame 48 is closed by a screen 52 having a large enough mesh to permit heat to be radiated from the top heating elements 38 through the screen onto the plastic held within a clamping fixture 46 in the molding station 14. A templet 54 having a relatively solid portion 56 capable of blocking heat radiated from the top heating elements 38 and a relatively open section 58 for passing heat radiated from the top heating elements 38 has a size and shape enabling it to fit within the frame 48 and be supported upon the screen 52 to control the location of the heat radiated upon the sheet of plastic held within the clamping fixture 46. Templets such as 54 have different shaped open portions depending upon the molding process that is to be performed.

Figure 4:
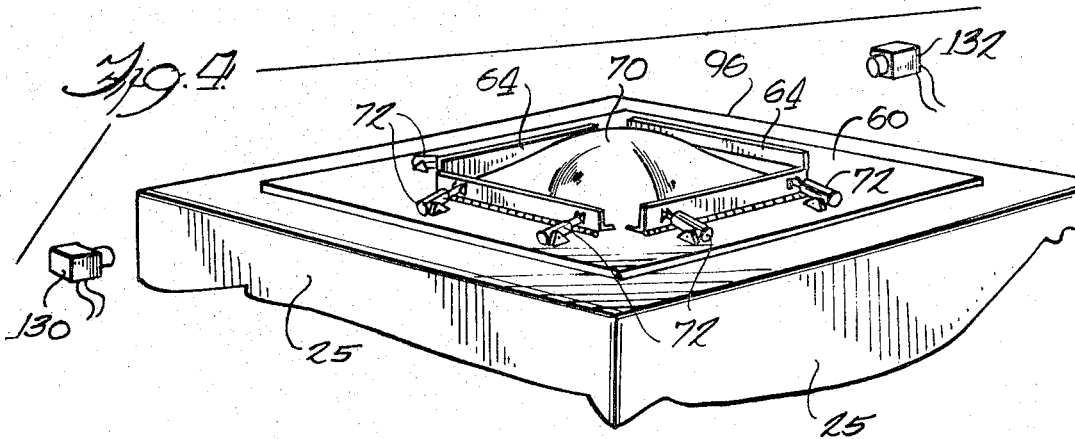
FIG. 4 is an enlarged, fragmentary, perspective view of the bottom platen and clamping fixture illustrating one step in the process performed by the embodiment of FIG. 1.

The plastic clamping fixture 46, as best shown in FIG. 4, includes an outer frame 60 that closes an opening in the vacuum tank 24. To clamp the plastic sheet 70 to the outer clamping frame 60, a rectangular inner clamping frame 64 is provided, which inner clamping frame is actuated by a plurality of air actuated clamping devices 72 mounted around the outer periphery of the outer clamping frame 60 with each of the clamping devices 72 including an air cylinder communicating with pneumatic lines for actuation of the clamps.

As best shown in FIG. 1 a pneumatic cylinder 78 is pivotally connected by a gudgeon 80 to the lever 82. The lever 82 is pivoted on the base member 22 by the gudgeon 84 and includes a longitudinally extending slot 86 at its upper end, which slot engages with a stud on the heat screen carriage 42 so that, as the air cylinder 78 moves the lever 82, the heat screen carriage 42 is moved along the parallel tracks 40 between the retract station 12 and the molding station 14. Similarly, the carriages for the heating elements 36 and 38 are moved between the retract station 12 and the molding station 14 by means of pneumatically actuated cylinders (not shown).

The molding station 14 includes a regular parallelepiped as a frame having four upstanding stanchions, two of which, 20 and 88, are shown in FIG. 1, with the stanchion 20 serving as part of the frame for the retract station 12 as well as for the molding station 14. Similarly, the molding station 14 includes four base members 22 with one base member 22 being shown in FIG. 1, two of the base members 22 serving as base members for both the retract station 12 and the molding station 14. Four upper cross bars 90 form the top portion of the frame, one of the cross bars being shown in FIG. 1.

To permit the upper and lower mold parts 94 and 96 to be driven together and apart, four elongated upstanding gear rack bars 92, two of which are shown in FIG. 1, are mounted between the cross bars 90 and the base members 22 of the molding station 14 and form an inner parallelepiped for supporting the upper and lower movable mold parts 94 and 96 of the molding station. The upper and lower movable mold parts 94 and 96 are each mounted within a different one of the upper and lower platens 98 and 100 which platens are driven vertically along the rack bars 92 by means of pinion gears 102. Pneumatic conduits 104, one being shown in FIG. 1, connect the upper and lower mold parts with sources of pneumatic pressure to aid in the molding operation.

To control the movement of the platens 98 and 100 for the movable platens, an upright column 106 extends between the base members 22 and the top cross bars 90 of the molding station 14 adjacent to the path of movement of the upper and lower platens 98 and 100 and this upright column 106 has mounted upon it four limit switches 108, 110, 112, and 114. The limit switch 108 is positioned at the uppermost location and the limit switch 110 is positioned at the lowermost location in the path of movement of the upper platen 98. The actuating levers of these two limit switches are engaged by the platen 98 to stop the movement thereof at the respective upper and lower locations. Similarly, the limit switch 112 is positioned at the uppermost level and the limit switch 114 is positioned at the lowermost level of the path of movement of the lower platen 100 to stop its movement.

Figure 3:
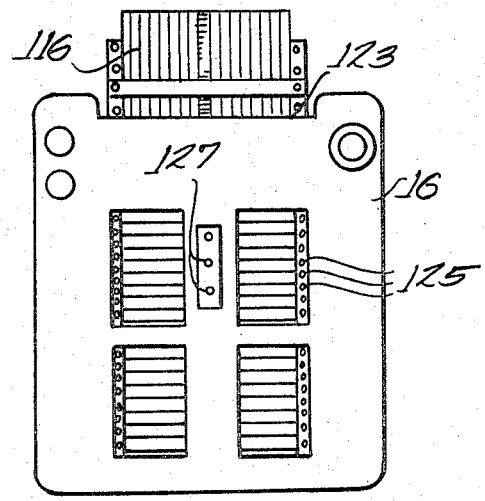
FIG. 3 is an enlarged elevational view of a programing unit used in the embodiment of the invention shown in FIG. 1.
Figure 5:
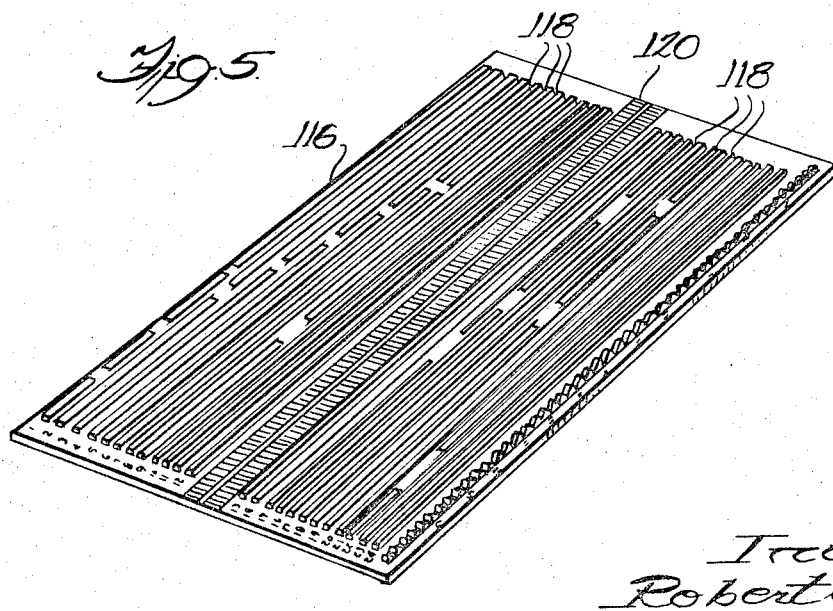
FIG. 5 is an enlarged perspective view of a programing card used in the embodiment shown in FIG. 1.
Figure 6:
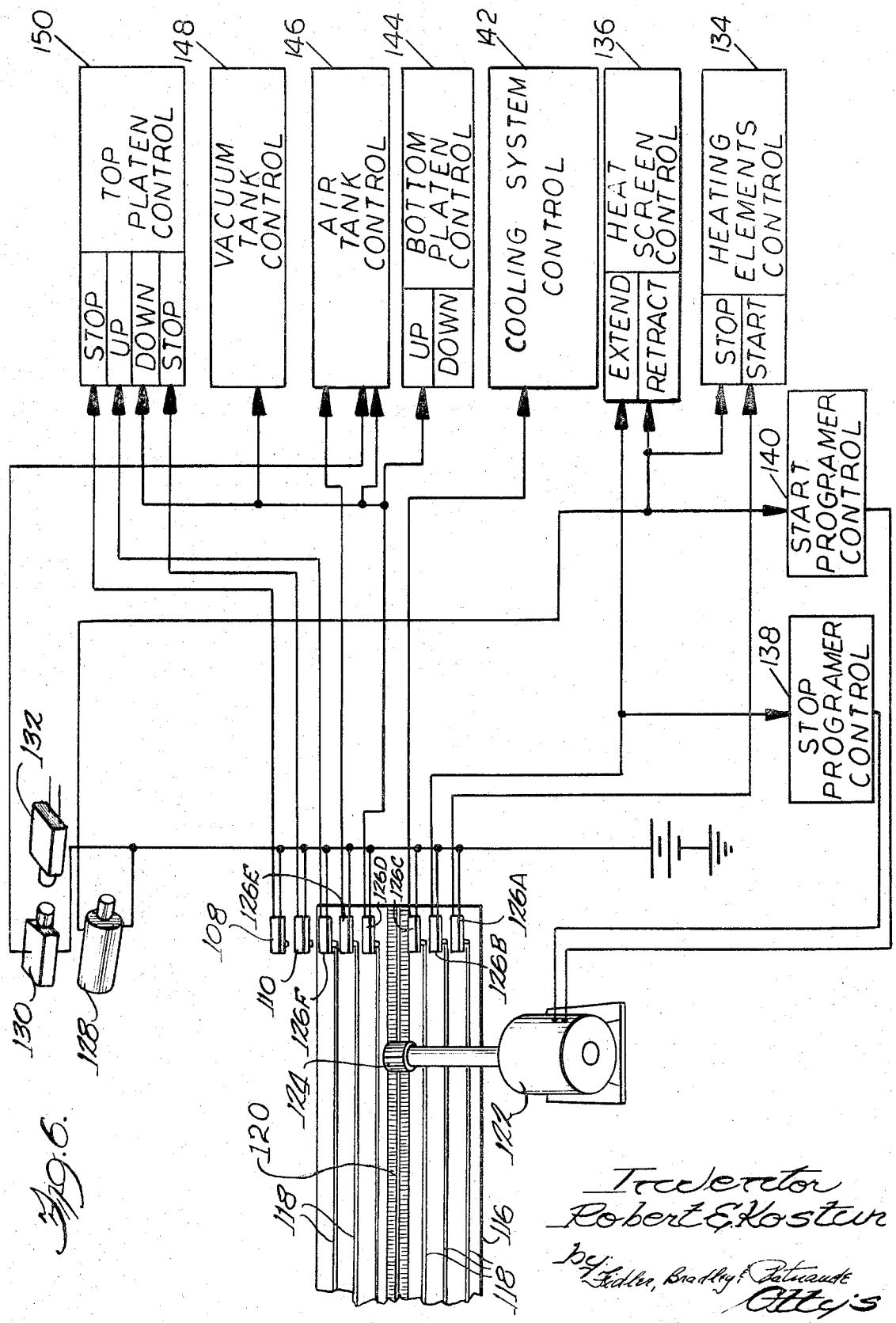
FIG. 6 is a block diagram illustrating the operation of the embodiment shown in FIG. 1.

The programing unit 16 includes a plastic card 116, shown best in FIGS. 3 and 5, which plastic card 116 includes a plurality of projecting rows 118 of plastic having notches cut therein and a central track 120. As best shown in FIG. 6, the track 120 of the plastic card 116 is engaged by a pinion gear 124 and both the gear and card are driven by a motor 122. A plurality of push-button switches 126A – 126F are mounted within the programing unit 16. Each of the switches has its actuating push-button aligned with a different one of the rows 118 so that the push-button switches are selectively closed by the notches as the plastic programming card 116 is driven by the motor 122. These push-button switches control different operations of the thermoforming apparatus 10.

The programming unit 16 and the card 116 are of a type sold by Otto Ramstetter, Fabrik Elektrotechnischer Apparate, 8 Munchen 25, Bruderhofstrasse 28–30.

The thermoforming equipment includes sensing devices to control its different operations. For example, heat sensing device 128 (FIG. 6) is positioned above the sheet of plastic within the molding station and senses its temperature. When the temperature of the sheet of plastic reaches a predetermined limit, this sensor activates a solenoid to turn off the bottom heaters 36. Similarly, the limit switches 108–114 control the limits of movement of the top and bottom platens 98 and 100. Moreover, the photo eye combination, 130 and 132 (FIGS. 4 and 6) monitor the height of the plastic sheet that is being billowed out from the mold cavity in the bottom platen 96.

These sensing devices control operations of the thermoforming machine and also control the drive motor 122 of the programing unit 16 to cause it to drive the program card 116 to further programing steps. As best shown in FIG. 3, the programing unit 16 includes a guideway opening 123 into which the program card 116 is inserted and a front face with a plurality of indicating lights 125 to indicate the step being performed and other indicating lights 127 to indicate the direction of motion of the program card.

OPERATION OF THE THERMOFORMING APPARATUS

The process for preparing each different type of plastic article differs slightly from the process used in preparing every other type of plastic article. For example, a different templet 54 is used to selectively soften different portions of the plastic sheet 70 and a different program card 116 is used to time the operations for different articles. The program card and templet are stored together with an identification of the product that they are used to prepare and they are taken from storage anytime they are needed.

To illustrate the operation of a thermoforming apparatus in accordance with the invention, selected steps in the fabrication of a typical product will be briefly explained although it is to be understood that not all of the operations are explained herein. However, the unexplained steps are well known in the art and differ from product to product to be molded.

At the start of the operation the selected templet 54 is positioned in the heat screen carriage 42 on the screen 52 within the frame 48 and the corresponding program card 116 is inserted into the program unit 16. A sheet of plastic 70 is inserted within the clamping fixture 46.

To begin the operations, the operator depresses two start buttons causing the pneumatic clamps 72 to close and the motor 122 to start the program card 116 along the guideway to the first notch in the rows 118. When the first notch is reached, the first of the lamps 125 on the program unit 16 is illuminated indicating the first step. The progress of the card 116 through the programing unit 16 is indicated thereafter by the illumination of successive lamps 125 to show the step being performed and by the position of printed indicia on the card with respect to a reference mark on the program unit.

The first step programmed on the card 116, for the purpose of explanation, will be considered as a step to increase the air pressure in the vacuum tank 24. To implement this step, a notch in one of the rows 118 of the plastic card 116 is moved until it actuates the actuating button of the push-button switch 126E which closes a circuit that energizes the air tank control 146 to pressurize the vacuum tank 24. The card 116 continues to be driven until two other notches actuate the actuating buttons of the push-button switches 126A and 126B which energize the heating elements control 134 and the heat screen control 136 to extend the heat screen carriage 42 with a templet 54 and to extend and energize the top heating elements 38 and the bottom heating elements 36. The push-button switch 126B, besides extending the heat screen, actuates the stop programmer control 138 which in turn de-energizes the motor 122 in the programing unit 16. This stops the motion of the program card 116.

While the plastic sheet 70 is being heated the electric eye arrangement 130, 132 (FIG. 4) controls the air pressure in the vacuum tank 24. When the beam from light source 130 is interrupted before reaching photocell 132 by the outwardly billowing plastic sheet 70, the pneumatic pump is stopped and when the beam is not interrupted the pump is started to further pressurize the vacuum tank 24.

After the temperature of the plastic has reached a predetermined limit, the heat sensor 128 actuates the start programmer control 140 to start the motor 122 and at the same time energizes the retract heat screen control 136 and retracts and de-energizes the heating elements 36 and 38.

This sequence of operations illustrates two modes in which the program unit interacts with the thermoforming machine in accordance with the invention. The first two steps were executed a predetermined time apart by the motion of the program card 116. The card was driven at a constant rate between these two steps by the motor to control the time of these two operations. However, the next operation was conditioned upon the temperature of the sheet of plastic and therefore could not be actuated a predetermined time after the previous step. Accordingly, the programing card was stopped while the heating elements continued to warm the plastic sheet. A heat sensing unit, after sensing that the plastic sheet had reached the desired temperature, started the programing unit again and turned off the heating elements. From this sequence it can be understood that the programing unit directly controls the time between steps, or in the alternative, conditions within the thermoforming operation control the timing of the programing unit as well as the operation of some of the steps in the thermoforming process.

The programing card 116 continues to move after being started by the heat sensor 128 until a notch engages the actuator button of the push-button switch 126D which responds by energizing the following four units, which are: (1) the air tank control 146 to discontinue the application of pressurized air into the vacuum tank 24; (2) the vacuum tank control 148 to apply vacuum to the vacuum tank 24 drawing the plastic sheet 70 downward into the mold cavity; (3) the top platen control 150 to start the motion of the top platen downward bringing the plunger of the top platen into the mold cavity of the bottom platen; and (4) the bottom platen control 142 to move the mold cavity in the bottom platen upward.

As the top platen moves downward it enegages the actuator lever on the limit switch 110 (FIGS. 1 and 6) which in turn energizes the top platen control 150 to stop the motion of the top platen downward. Similarly, the limit switch 112 steps motion of the bottom platen (not illustrated in FIG. 6). Meanwhile the card 116 continues to move until at sometime later a notch passes under the actuator button of the push-button switch 126F which in turn energizes the top platen control 150 to begin moving the top platen upward. As the top platen moves upward it engages the actuator lever of the limit switch 108 (FIGS. 1 and 6) which in turn actuates the top platen control 150 to stop the motion of the top platen in its upward direction.

The above sequence of operations illustrates concurrent control by the programing unit and by elements of the thermoforming machine. For example, the motor 122 starts to move the program card forward at the same time that the top platen is started in its downward direction. The platen is stopped by a separate limit switch while the program card 116 is still being moved forward. At a predetermined time later another push-button switch is actuated within the programing unit by the programing card 116 to move the top platen back upward towards its final position. In summary, the programing apparatus starts an operation which is stopped by an external control while the program card is still in motion. A predetermined time later the program card again starts the operation in a different direction. The operation is controlled at the same time by a sensing device i.e. the limit switch and by the programing unit 16.

The program card continues to move and a notch passes under push-button switch 126C which energizes the cooling system control 142 to start cooling fans and a vapor spray system (not shown) for cooling the plastic sheet 70. Later further push-button switches (not shown) are actuated by the program card to disconnect the vacuum from vacuum tank 24 and to pressurize it so as to eject the formed plastic sheet and still later to lower the bottom platen and open the clamp frame.

It can be seen that the programing unit and the thermoforming apparatus are simple and economical. Moreover, the process of thermoforming articles with this equipment is performed without skilled operators and with a reliability heretofore unobtainable with relatively inexpensive equipment. The program card and other special units such as the templets are stored indefinitely and then utilized by relatively unskilled labor to reproduce articles faithfully even if the operator has never made such articles before.

Although a preferred embodiment of the invention has been described with a certain degree of particularity, many modifications and variations of the embodiment are possible in the light of the above teachings. It is therefore to be understood that, within the scope of the appended claims, the invention may be practiced otherwise than as specifically described.

What is claimed is:

1. A control system for a thermoforming apparatus, comprising control means for controlling a plurality of operations of said apparatus in a predetermined sequence, programming means for receiving a programming medium movable along a guideway thereof, driving means for moving said medium along said guideway at a predetermined constant speed, an energization circuit for said driving means, a plurality of switching means responsive to the position of said programming means along said guideway and connected to said control means to operate said apparatus in said predetermined sequence and to control the duration of at least one of said operations in response to the speed of said medium and the spacing of ones of said switches along said guideway, a plurality of sensing devices mounted in said thermoforming apparatus for sensing conditions therein and, when activated, for interrupting said energization circuit to stop the movement of said programming medium until a predetermined condition is sensed, and circuit means interconnecting respective ones of said switching means and said sensing devices for selectively activating said sensing devices during predetermined ones of said plurality of operations.

2. The combination of claim 1 in which at least one of said sensing devices includes a limit switch.

3. The combination of claim 1 in which at least one of said sensing devices includes a heat sensing device.

4. The combination of claim 1 further comprising:

a carriage for a heat screen mounted within said thermoforming apparatus;

a heat screen mounted to said carriage;

third means for driving said heat screen;

said control means including a means for actuating said heat screen carriage driving means in response to the closing of one of said switches and sensing devices.

5. The combination of claim 4 further including a program card serving as said medium and having engageable surfaces positioned in rows, said engageable surfaces actuating said one of said switching means as said program card is driven through said guideway.

6. The combination of claim 5 in which different engageable surfaces on said card control the time of operation of individual portions of said thermoforming apparatus.

7. The combination of claim 5 in which one of said switching means engaged by one of said engageable surfaces starts an operation within said thermoforming apparatus and a sensing device terminates the operation.

8. The combination of claim 6 including means for starting an operation of said thermoforming apparatus upon the actuation of one of said sensing devices and terminating said operation upon the actuation of one of said program switches.

9. A combination of a thermoforming apparatus with a programming unit that controls the operation of the thermoforming apparatus in accordance with a program recorded on a medium in the form of engageable surfaces thereon, comprising:

a guideway adapted to receive said medium;

program driving means for moving said medium along said guideway;

a plurality of program switches in said guideway, positioned to be actuated by said engageable surfaces of said medium;

a plurality of sensing devices including limit switches mounted to said thermoforming apparatus for sensing conditions therein;

first means connected to said program switches and sensing devices for controlling operations of said thermoforming apparatus in response to the actuation of said program switches and sensing devices;

second means connected to said program switches and sensing devices for controlling the energization of said program driving means, a carriage for a heat screen mounted within said thermoforming apparatus;

a heat screen mounted to said carriage;

third means for driving said heat screen;

said first means including a means for actuating said heat screen carriage driving means in response to the closing of one of said switches and sensing devices, a program card serving as said medium and having engageable surfaces positioned in rows, said engageable surfaces actuating said program switches as said program card is driven through said guideway, different engageable surfaces on said card controlling the time of operation of individual portions of said thermoforming apparatus, said first means includes means for starting an operation of said thermoforming apparatus upon the actuation of one of said sensing devices and terminating said operation upon the actuation of one of said program switches, said second means includes a means for stopping said program driving means in response to the actuation of one of said program switches and for starting said program driving means in response to the actuation of one of said sensing devices, a clamping carriage for holding a sheet of plastic;

heating elements for heating said sheet of plastic;

said means for controlling said thermoforming apparatus including means for causing heat from said heating elements to impinge upon said plastic and for causing said heat screen to partially shield said plastic at least over a portion of the cycle of use of the thermoforming apparatus;

at least one plunger and one mold cavity;

means controlled by said programming unit to move said clamping mechanism adjacent to one of said plunger and mold cavities;

means for bringing said one plunger and mold cavity together under the control of said programming unit;

a source of pressurized gas;

means for connecting said pressurized gas to said mold cavity in response to the closing of one of said program switches, whereby said plastic sheet in said clamping means is caused to billow outwards;

a photocell sensing means for sensing the height of billowing of said plastic sheets;

said photocell sensing device including one of said limit switches;

said first means and second means including a means for energizing the motor of said programming apparatus and for disconnecting said source of pressurized gas from said cavity in response to the closing of said one limit switch; and said first means including a means for moving said plunger into said mold cavity in response to the closing of another of said program switches.

* * * * *